US005553346A

United States Patent [19]
McElroy

[11] Patent Number: 5,553,346
[45] Date of Patent: Sep. 10, 1996

[54] TAPERED BAG BLOWER SYSTEM

[76] Inventor: Lucian G. McElroy, 3315 Brocker Rd., Metamora, Mich. 48455

[21] Appl. No.: 407,184

[22] Filed: Mar. 21, 1995

[51] Int. Cl.⁶ .................................................. B60S 3/04
[52] U.S. Cl. .......................................... 15/316.1; 15/405
[58] Field of Search ................................. 15/316.1, 405, 15/312.1

[56] References Cited

U.S. PATENT DOCUMENTS

| | | | |
|---|---|---|---|
| 2,440,157 | 4/1948 | Rousseau . | |
| 3,903,562 | 9/1975 | Miles | 15/312.1 X |
| 3,994,041 | 11/1976 | Barber | 15/312.1 X |
| 4,161,801 | 7/1979 | Day et al. . | |
| 4,418,442 | 12/1983 | Day et al. | 15/316.1 X |
| 4,622,714 | 11/1986 | Tomasello . | |
| 4,817,301 | 4/1989 | Belanger et al. | 15/316.1 X |
| 4,969,272 | 11/1990 | Schleeter et al. . | |

*Primary Examiner*—Chris K. Moore
*Attorney, Agent, or Firm*—Howard & Howard

[57] ABSTRACT

A blower system (10) for use in a car wash includes a support plenum (12) comprising two side supports (14, 16) and an overhead support (18), each supporting a blower bag (24, 26, 28). The blower bags (24, 26, 28) are comprised of flexible material. Long and short gussets (46, 48) are spaced across the width of the bags (24, 26, 28) to maintain the bags in a substantially rectangular cross section shape throughout the length of the bag (24, 26, 28). The bags (24, 26, 28) taper to a nozzle (32) to supply the pressurized air to the vehicle.

20 Claims, 3 Drawing Sheets

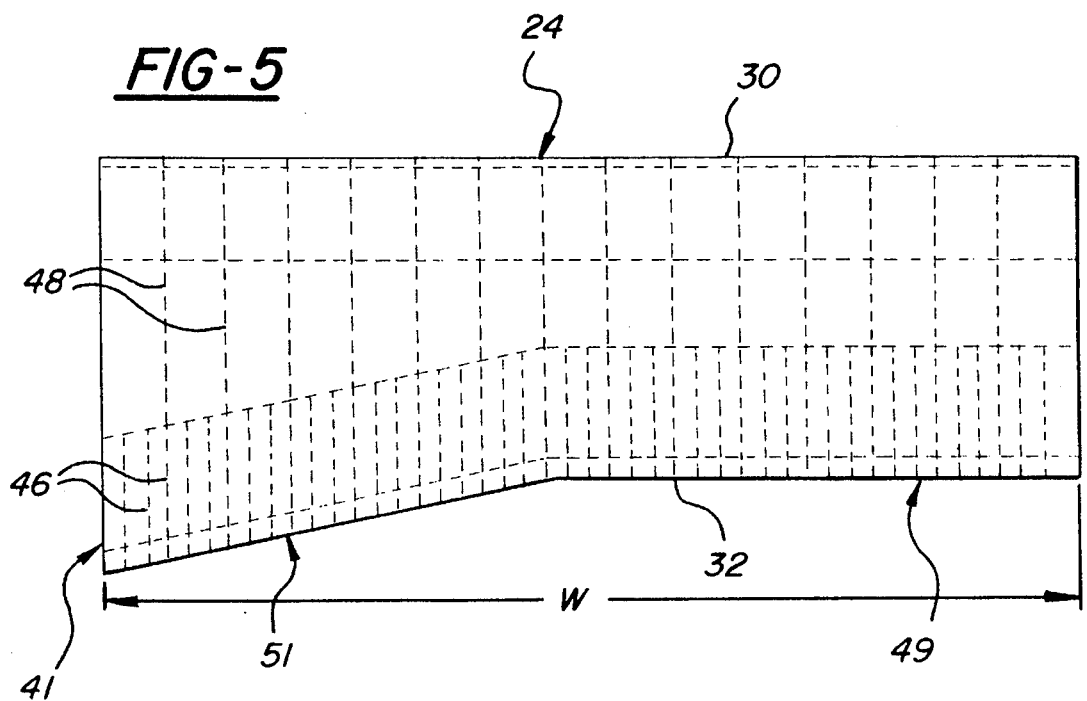
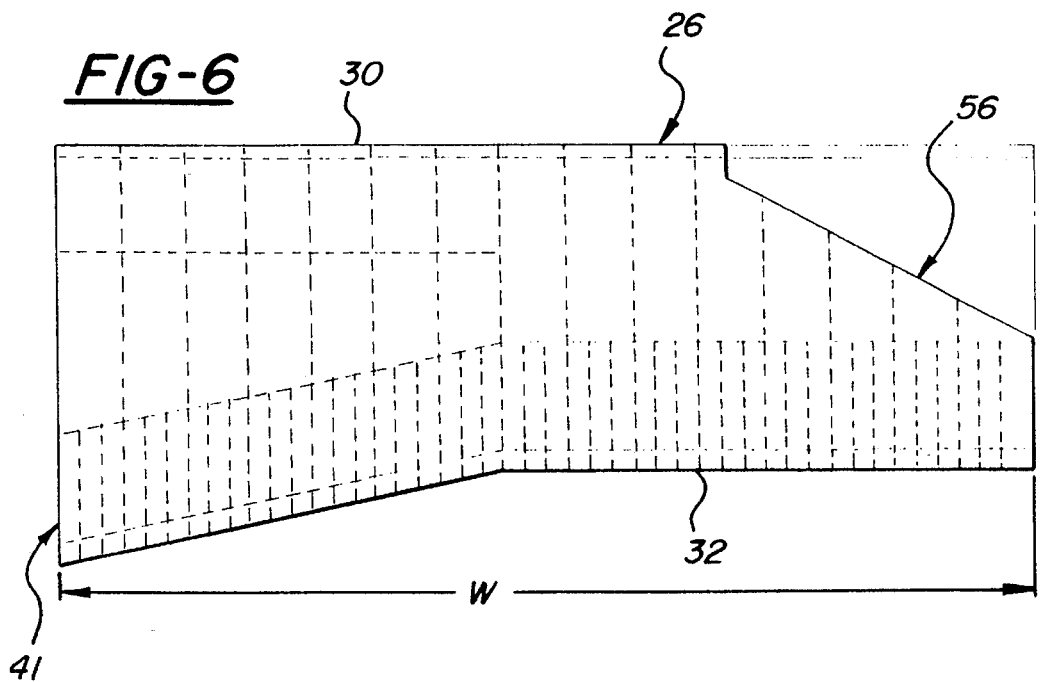

TAPERED BAG BLOWER SYSTEM

TECHNICAL FIELD

The invention relates to a fluid stripping apparatus for stripping fluid from an object, and more particularly towards an apparatus used in a car wash system for stripping rinse water from vehicles.

BACKGROUND OF THE INVENTION

Conventional car wash systems include a drying station near the exit of the car wash line for drying rinse water from the surface of vehicles. The sides of each vehicle are dried by stationary blower units located on the sides of the car wash line which include one or more vertical nozzles. The top surface of the vehicle is dried by one or more overhead blower ducts. The overhead blower ducts are hinged at one end to permit vertical movement, and normally include a roller-type follower at its free end for following the longitudinal contour of the vehicle.

A specific fluid stripping apparatus is disclosed in U.S. Pat. No. 4,161,801 issued Jul. 24, 1979 in the name of Day et al, and owned by the assignee of the subject invention. The patent discloses the use of flexible, inflatable bags of generally rectangular transverse cross-section having an inlet for introducing air under pressure into the bag and an elongated opening at the bag end defining a nozzle to admit the stream of air to a vehicle for drying purposes. The nozzle end of the bag lies in the path of motion of the object to cause physical engagement between the nozzle end of the bag and the object to bring the stream of air emitted from the nozzle opening into close space relationship with the surface of the object.

Another type of blower apparatus is set forth in U.S. Pat. No. 4,969,272 issued Nov. 13, 1990 in the name of Schleeter et al which discloses circular sleeves or cloth ducts acting as blowers which include tapered ends. The duct end portions are flattened to better shape the stream of air exiting the duct end portion. The flattening of the discharge opening adjacent the end edge is attained by cloth fabric strips or tabs with their ends fastened by stitching to the opening.

Also of interest is U.S. Pat. No. 4,622,714 issued Nov. 18, 1986 in the name of Tomasello which discloses tapered air blowers which have a generally circular cross-section. Such blowers and nozzles are typically made of fiberglass or any other low friction material.

U.S. Pat. No. 2,440,157, issued to Rousseau discloses a drier for vehicles having tapered ducts.

In general, the prior art fails to disclose a simple blower apparatus having the effectiveness of U.S. Pat. No. 4,161,801, along with minimized depth dimension to fit inside any car wash system with lower cost.

SUMMARY OF THE INVENTION

The invention is an apparatus for blowing fluid from the surface of an object. The apparatus comprises a support plenum for directing pressurized air therethrough. A blower is included for connection to the support plenum for producing the pressurized air. At least one flexible bag is included of substantially rectangular transverse cross-section connected to the support plenum for receiving the pressurized air and directing the pressurized air toward the object. The apparatus is characterized by the flexible bag including an elongated inlet having a first width and thickness, the bag extending to and tapering to an outlet nozzle of a second thickness less than the first thickness and of the first width. The flexible bag and the outlet nozzle comprise a flexible material.

Also included is the support plenum including only two side supports and an overhead support extending between the side supports and perpendicular therewith. At least three flexible bags are included comprising an overhead bag extending from the overhead support, and first and second side bags extending from the side supports.

BRIEF DESCRIPTION OF THE DRAWINGS

Other advantages of the present invention will be readily appreciated as the same becomes better understood by reference to the following detailed description when considered in connection with the accompanying drawings wherein:

FIG. 5 is a plan view of the first side bag; and

FIG. 6 is a plan view of the second side bag.

DETAILED DESCRIPTION OF THE PREFERRED EMBODIMENT

Figure 1:
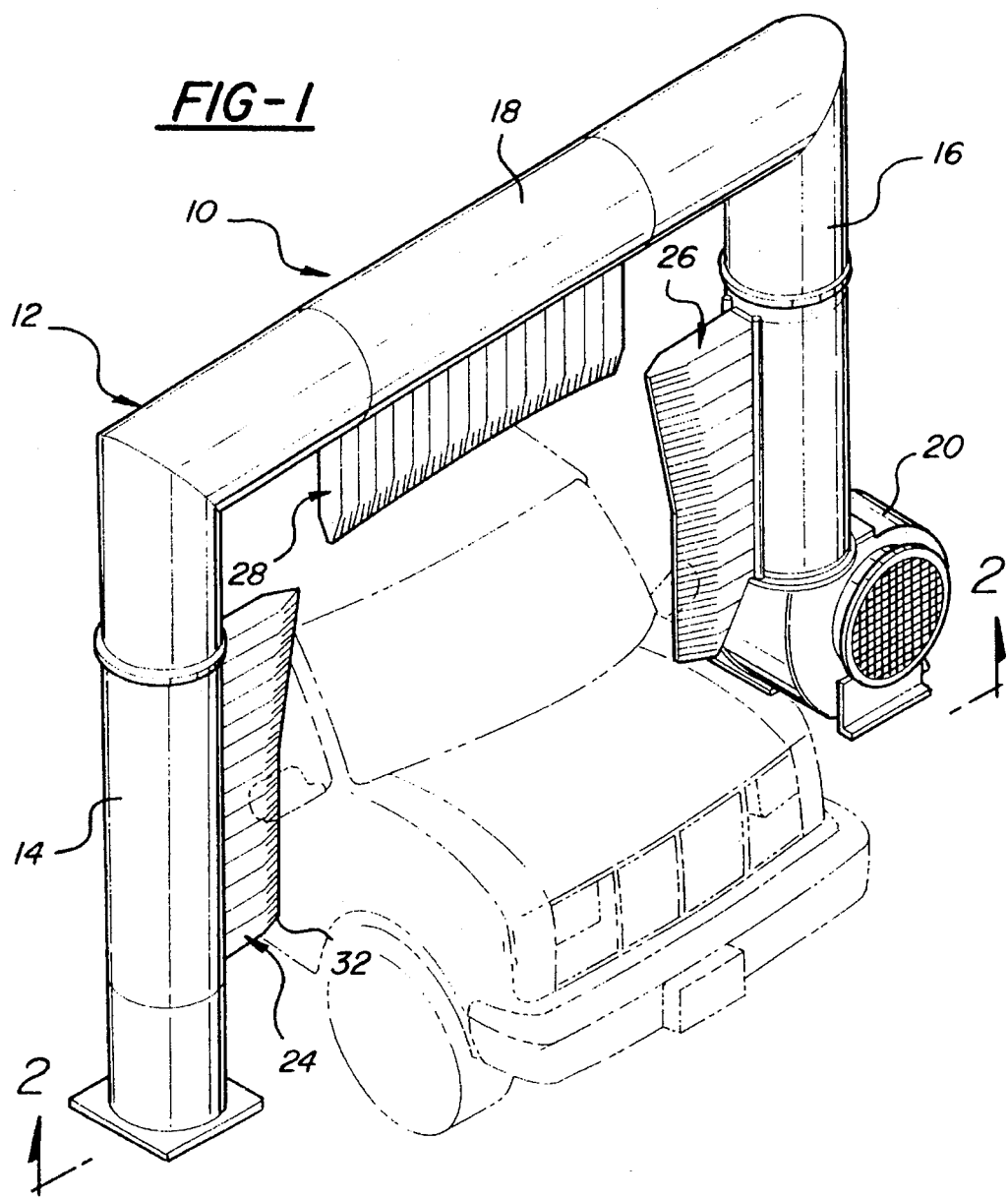
FIG. 1 is a perspective view of the subject invention.

The drying station apparatus of a car wash system is generally shown at 10 in FIG. 1. While the invention has broader application, it is described herein with reference to a car wash system since it is particularly applicable to such systems.

The apparatus 10 includes a support plenum 12 for directing pressurized air therethrough. Such support plenum 12 is generally an air distributor for distributing air to various sides of the vehicle. The support plenum 12 includes first and second side supports 14, 16 with an overhead support 18 extending between the side supports 14, 16. The side supports 14, 16 and overhead support 18 comprise air ducting of generally circular cross-section with the overhead support 18 connected perpendicular to the side supports 14, 16. The support plenum 12 may be supported on the floor of a building which contains the car wash system.

A blower 20 is connected to the support plenum 12 for producing the pressurized air. In the preferred embodiment, the blower 20 is a 25 horsepower blower with a load limit design. Such a blower 20 which has been found to be suitable is that by Buffalo Forge Company, which can produce 9,000–12,000 CFM at the general 25 HP. In the preferred embodiment, the blower 20 is connected to the base or lower portion of the second side support 16, which supplies the pressurized air continuously through the entire support plenum 12, through each of the first and second side supports 14, 16 and overhead support 18.

Each of the first and second side supports 14, 16 and overhead support 18 include longitudinal openings 22 to allow air to pass therethrough. Such openings 22 are generally rectangular, and substantially slotted.

The apparatus 10 include a plurality of flexible air bags 24, 26, 28 connected to the support plenum 12 for receiving the pressurized air and directing the pressurized air toward the object or vehicle. A first side bag 24 is connected to the first side support 14, a second side air bag 26 is connected to the second side support 16, and air overhead bag 28 is connected to the overhead support 18. The air bags 24, 26, 28 are connected to the supports 14, 16, 18 at the longitudinal openings 22 to receive the passage of pressurized air. The connection of the bags 24, 26, 28 to the support plenum 12 are commonly known in the art to allow sealing of the bag 24, 26, 28 thereto.

The air bags 24, 26, 28 are flexible and are comprised entirely of a flexible material. The bags 24, 26, 28 include an elongated inlet 30 of a first width W and thickness T. The bags 24, 26, 28 extend and taper to an outlet nozzle 32 of a second thickness less than the first thickness and a second width substantially the same as the first width. The width of the bags 24, 26, 28 extend greater than the length of the openings 22, and the length is the dimension greater than the length of the bags 24, 26, 28 which extends between the inlet 30 and nozzle 32. The bags 24, 26, 28 and outlet nozzle 32 are comprised of a flexible material, such as nylon. The bags 24, 26, 28 and outlet nozzle 32 are formed of the common material, and are generally formed from an integral sheet of the flexible material, as subsequently discussed.

Each of the bags 24, 26, 28 are similarly constructed, though the shape thereof varies depending on the location of the bag. The construction of the bags 24, 26, 28 will be described hereinafter with reference to the overhead bag 28, though it is to be understood that the remaining bags 24, 26 are similarly constructed only varying in plan shape, as will be discussed.

Figure 4A:
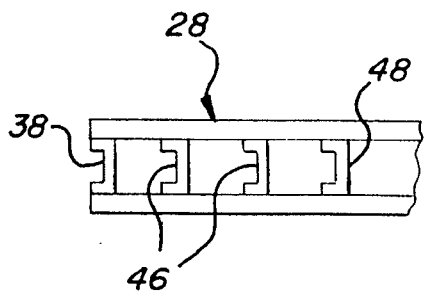
FIG. 4a is a partial end view taken along lines 4a–4a of FIG. 3.
Figure 4B:
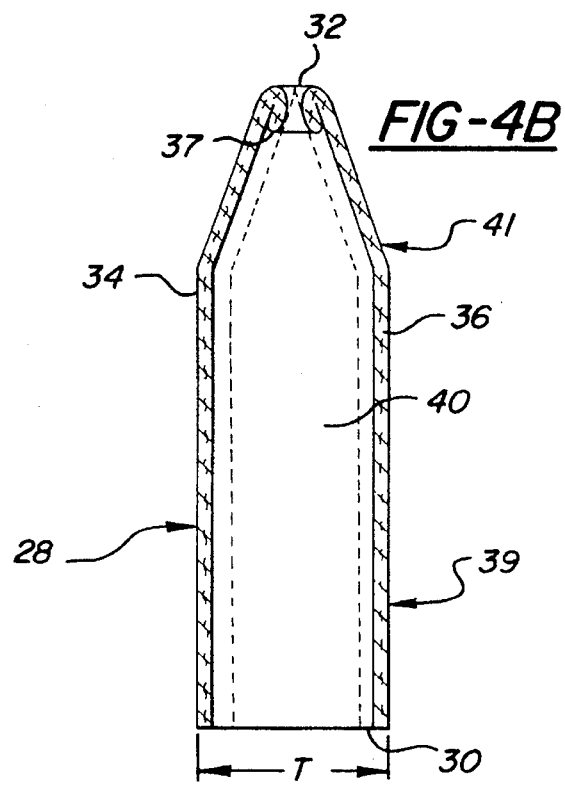
FIG. 4b is a cross-sectional view taken along lines 4b–4b of FIG. 3.

The overhead bag 28 is comprised of first and second sheets or panels 34, 36 of the flexible material establishing the first length L extending between the elongated inlet 30 and the outlet nozzle 32 and the first width W extending parallel with the overhead support 18. The bag 28 also includes a pair of generally parallel sides 38, 40 perpendicular to and connecting the panels 34, 36 to one another with a portion of the panels 34, 36 parallel to one another. The sides 38, 40 provide the first and second thickness of the bag 28. More specifically, the sides 38, 40 include a generally elongated rectangular section 39 adjacent the overhead support 18 comprising approximately two-thirds of the length of the bag 28 from the inlet 30, and which extends to a tapered portion 41, generally triangular in shape with the peak thereof forming the outlet of the nozzle 32 (See FIG. 4b). It can be understood from the shape of the sides 38, 40, that the panels 34, 36 follow the rectangular 39 and triangular 41 contour by being stitched or fixedly connected thereto. Therefore, the tapered outlet nozzle 32 extends for the width W of the bag 28.

The bag 28 also includes a plurality of reinforcing members or gussets 46, 48 which are generally uniform in size and shape with the parallel sides 38, 40, and are connected between the first and second panels 34, 36. The gussets 46, 48 are generally parallel to the sides 38, 40 for maintaining the shape of the bag 28 and the output nozzle 32 in a substantially rectangular cross-section (See FIGS. 3 and 4a). The bag 28 comprises short 46 and long 48 gussets. The short gussets 46 extend for the length of the tapered or triangular section 41 while the long gussets 48 extend the entire length of the bag 28 between the inlet 30 and nozzle 32. The short and long gussets 46, 48 alternate with each other for the width the bag 28. Each of the gussets 46, 48 are similarly stitched to the panels 34, 36, as the sides 38, 40. In the preferred embodiment, the gussets 46, 48 alternate with one long gusset 48 for every pair of short gussets 46, i.e., one long gusset 48, two short gussets 46, one long gusset 48, two short gussets 46, etc. The gussets 46, 48 are equally spaced from one another. In the preferred embodiment, each gusset 46, 48 is approximately 1 5/16 inch spaced from each adjacent gusset 46, 48. The end of the outlet nozzle 32 is generally comprised of the panels 34, 36 with a slightly turned under edge 37 which is stitched under to increase rigidity and maintain the rectangular shape.

Figure 3:
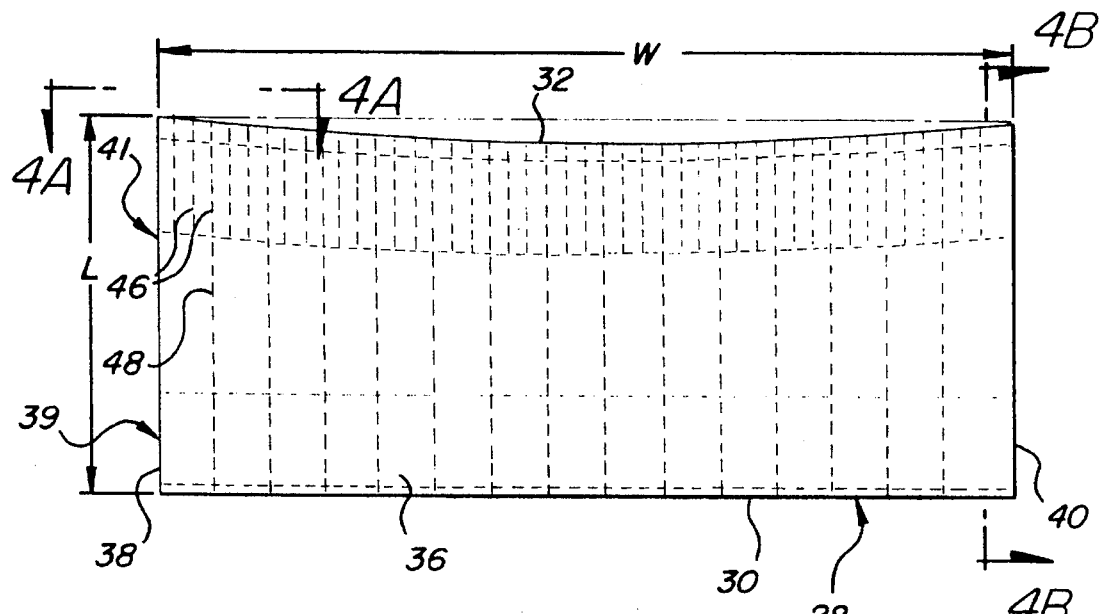
FIG. 3 is a plan view of the overhead bag.

The shape of overhead bag 28 is specifically illustrated in FIG. 3. The outlet nozzle 32 has a concave outlet edge directed away from the overhead support 18. This concave edge is shaped generally to fit a typically van curvature to minimize the distance thereto, along with any other car. The overhead bag 28 comprises a generally elongated rectangular shape with the convex longitudinal edge along the width W.

The first and second bags 24, 26 have a longitudinal width parallel with the side supports 14, 16. The outlet nozzle 32 has a nozzle edge with a bend therein.

More specifically, FIG. 5 illustrates the first side bag 24. The shape of the bag 24 is substantially rectangular in shape 49, with the nozzle 32 including a flared portion 51 having a straight edge angling away from parallel with the inlet 30. The remainder of the bag 24, i.e., rectangular portion 49, has the inlet 30 parallel to the nozzle 32 which extends slightly greater than half the width of the bag 24 for integral connection to the flared portion 51.

FIG. 6 specifically illustrates the second side bag 26. The second side bag 26 is substantially similar to the first side bag 24 but includes a cut-away section 56 which extends downwardly from the inlet 30 to provide an outlet nozzle 32 of a length longer than the inlet 30. The inlet 30 of the second side bag 26 is shorter than the inlet 30 of the first side bag 24. This provides the necessary air supplying length along a vehicle while decreasing the outlet 22 length to compensate for the position of the blower 20. As can be seen, the nozzle 32 extends the same as in the first side bag 24, but the length of the inlet 30 has been shortened so as not to interfere with the blower 20.

Figure 2:
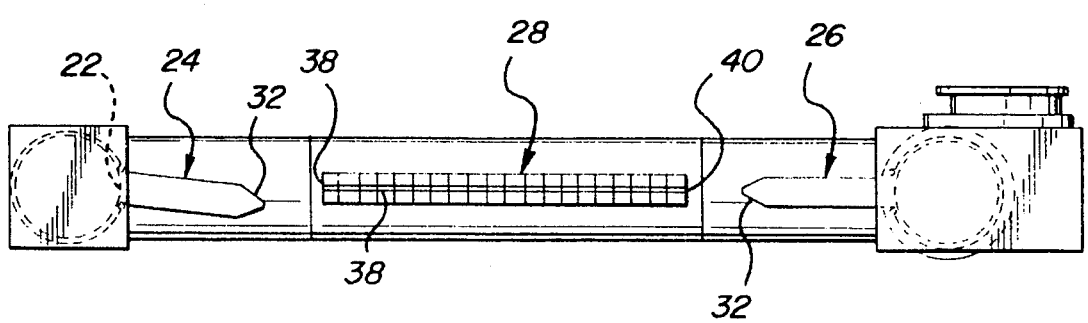
FIG. 2 is a bottom view taken along line 2—2 of FIG. 1 of the subject invention.

As best seen in FIG. 2, the bags 26, 28 extend inwardly from the plenum 12 in a single plane, and the first side bag 24 is slightly angled away from the plane. The first side bag 24 is offset from the plane and second side bag 26, i.e., the outlet nozzles 32 are not directly positioned toward one another. In the preferred embodiment, the first side bag 24 is off-set from the plane approximately 5°. This off-set has allowed the pressurized air to be centralized on a vehicle passing therethrough, i.e., the air pressure currents meet in the middle of the vehicle or center of the plenum 12. If the side bags 24, 26 were directed toward one another, the center of the pressurized air would be located closer to the second side bag 26, as it provides less air pressure due to its configuration and location to the blower 20.

Approximately 17 inches of pressurized air is produced by the first side bag 24 and overhead bag 28. The second side bag 26 provides a differential air pressure due to the cut-away section 56, approximately 2 inches less in pressure along its width.

Due to the restriction at the outlet end or nozzle 32 of the bags 24, 26, 28, a bag pressure is created slightly greater than atmosphere pressure to keep the bags 24, 26, 28 in an inflated condition. When inflated, the air pressure in the bags 24, 26, 28 causes the bags to be somewhat stiff or rigid. Therefore, even though the bags 24, 26, 28 are made of a flexible material, they are self-supporting when inflated. The bags 24, 26, 28 however are sufficiently deformable under an applied force so that when engaged by a vehicle moving through the car wash, the bags 24, 26, 28 may be pushed aside.

As should be apparent from the foregoing description, as the vehicle passes through a drying station constructed in accordance with the instant invention, the rinse water on the surface of the vehicle will be effectively blown-off.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

What is claimed is:

1. An apparatus for blowing fluids from a surface of an object, said apparatus comprising:

a support plenum (12) for directing pressurized air therethrough;

a blower (20) connected to said support plenum (12) for producing said pressurized air;

at least one flexible bag (24, 26, 28) of substantially rectangular cross-section connected to said support plenum (12) for receiving the pressurized air and directing the pressurized air toward the object;

said apparatus characterized by said flexible bag (24, 26, 28) including an elongated inlet (30) of a first width and thickness, said bag extending and tapering to an outlet nozzle (32) of a second thickness less than said first thickness and of said first width, said flexible bag (24, 26, 28) and said outlet nozzle (32) comprising exclusively a flexible material.

2. An apparatus as set forth in claim 1 further characterized by said flexible bag (24, 26, 28) and said outlet nozzle (32) comprising the same flexible material.

3. An apparatus as set forth in claim 2 further characterized by said flexible bag (24, 26, 28) and said outlet nozzle (32) comprising an integral sheet of flexible material formed between said inlet and said outlet nozzle.

4. An apparatus as set forth in claim 1 further characterized by said flexible bag (24, 26, 28) comprising first and second panels (34, 36) of flexible material establishing said first width and a length extending between said inlet (30) and said outlet nozzle (32), and a pair of generally parallel sides (38, 40) connecting said panels (34, 36) to one another with a portion of said panels (34, 36) parallel to one another, said sides (38, 40) providing said first and second thickness.

5. An apparatus as set forth in claim 4 further characterized by said flexible bag (24, 26, 28) including a plurality of gussets (46, 48) connected between said first and second panels (34, 36) and substantially parallel to said sides (38, 40) for maintaining said bag (24, 26, 28) in a substantially rectangular cross-section.

6. An apparatus as set forth in claim 5 further characterized by said gussets (46, 48) being spaced equal distance from one another between said sides (38, 40).

7. An apparatus as set forth in claim 6 further characterized by said gussets (46, 48) comprising short and long gussets, said short gussets (46) extending from said outlet nozzle (32) for the length of a tapered portion (41) of said bag (24, 26, 28).

8. An apparatus set forth in claim 7 further characterized by said long gussets (48) extending the length of said bag (24, 26, 28) between said inlet (30) and outlet nozzle (32).

9. An apparatus as set forth in claim 1 further characterized by including at least three flexible bags.

10. An apparatus as set forth in claim 9 further characterized by said support plenum (12) comprising only two side supports (14, 16) and an overhead support (18) extending between said side supports (14, 16) and perpendicular therewith.

11. An apparatus as set forth in claim 10 further characterized by said at least three bags comprising an overhead bag (28) extending from said overhead support (18), and first and second side bags (24, 26) extending from said side supports (14, 16).

12. An apparatus as set forth in claim 11 further characterized by said overhead bag (28) extending downwardly from said overhead support (18) and including a longitudinal length parallel with said overhead support (18), said outlet nozzle (32) having a concave longitudinal edge relative to said overhead support (18).

13. An apparatus as set forth in claim 12 further characterized by said first and second bags (24, 26) having a longitudinal length parallel with said side supports (14, 16), said outlet nozzle (32) having two portions angular to one another.

14. An assembly as set forth in claim 10 further characterized by said support plenum (12) only including said two side supports and said overhead support, and only three bags (24, 26, 28).

15. An assembly as set forth in claim 14 further characterized by said blower (20) connected at a lower end of one of said side supports (14, 16) for supplying pressurized air to all of said plenum (12).

16. An apparatus for stripping fluids from a surface of an object, said apparatus comprising:

a U-shaped support plenum (12) for directing pressurized air therethrough;

a blower (20) connected to said support plenum (12) for producing said pressurized air;

three flexible bags (24, 26, 28) each of generally rectangular cross-section connected to said support plenum (12) for receiving the pressurized air and directing the pressurized air toward the object;

and characterized by said support plenum (12) including only two vertically extending side supports (14, 16) and an overhead support (18) extending between said side supports (14, 16) and an overhead support (18) extending between said side supports (14, 16) and perpendicular therewith; said three flexible bags (24, 26, 28) comprising an overhead bag (28) extending from said overhead support, and first and second side bags (24, 26) extending from said side supports (14, 16) vertically below said overhead support (18).

17. An assembly as set forth in claim 16 further characterized by said blower (20) connected at a lower end of one of said side supports for supplying pressurized air to all of said plenum (12).

18. An apparatus as set forth in claim 17 further characterized by said overhead bag (28) extending downwardly from said overhead support (18) and including a longitudinal length parallel with said overhead support (18), said outlet nozzle (32) having a concave longitudinal edge relative to said overhead support (18).

19. An apparatus as set forth in claim 18 further characterized by said first and second bags (24, 26) having a longitudinal length parallel with said side supports (14, 16), said outlet nozzle (32) having two portions angular to one another.

20. An apparatus for stripping fluids from a surface of an object, said apparatus comprising:

a support plenum (12) for directing pressurized air therethrough;

a blower (20) connected to said support plenum (12) for producing said pressurized air;

said support plenum (12) including two side supports (14, 16) and an overhead support (18) extending between said side supports (14, 16) and perpendicular therewith;

a plurality of blower bags (24, 26, 28) connected to said support plenum (12) for issuing an output flow from each bag, said plurality of blower bags (24, 26, 28) including a first side bag (24) connected to one of said side supports (14), a second side bag (26) connected to the other of said side supports (16), and an overhead bag (28) connected to said overhead support (18);

said assembly characterized by said overhead bag (28) and said second side bag (26) being disposed to direct the output flows therefrom along a first plane, and said first side bag (24) being disposed to direct the output flow therefrom in a second plane offset from said first plane.

* * * * *